United States Patent
Neria et al.

(10) Patent No.: US 10,275,465 B2
(45) Date of Patent: Apr. 30, 2019

(54) METHOD AND SYSTEM FOR SCAN-FREE DETECTION OF AUTO-COMMITTED FILES IN A WRITE-ONCE-READ-MANY STORAGE DEVICES

(71) Applicant: Dell Products L.P., Round Rock, TX (US)

(72) Inventors: Noa Neria, Tel Aviv (IL); Itay Dar, Rishon le Zion (IL); Michael Estrin, Rishon le-Zion (IL)

(73) Assignee: Dell Products L.P., Round Rock, TX (US)

( * ) Notice: Subject to any disclaimer, the term of this patent is extended or adjusted under 35 U.S.C. 154(b) by 235 days.

(21) Appl. No.: 15/458,506

(22) Filed: Mar. 14, 2017

(65) Prior Publication Data

US 2018/0267980 A1    Sep. 20, 2018

(51) Int. Cl.
*G06F 17/30*    (2006.01)
(52) U.S. Cl.
CPC .. *G06F 17/30085* (2013.01); *G06F 17/30188* (2013.01); *G06F 17/30227* (2013.01)
(58) Field of Classification Search
CPC ......... G06F 17/30085; G06F 17/30227; G06F 17/30188
See application file for complete search history.

(56) References Cited

U.S. PATENT DOCUMENTS

| | | | |
|---|---|---|---|
| 8,516,022 B1* | 8/2013 | Kanteti | G06F 17/30188 707/827 |
| 2004/0186858 A1* | 9/2004 | McGovern | G06F 17/30188 |
| 2005/0097260 A1* | 5/2005 | McGovern | G06F 3/0623 711/100 |
| 2005/0120025 A1* | 6/2005 | Rodriguez | G06F 17/30073 |
| 2007/0174565 A1* | 7/2007 | Merrick | G06F 17/30085 711/161 |

* cited by examiner

*Primary Examiner* — Leslie Wong
(74) *Attorney, Agent, or Firm* — Pearl Cohen Zedek Latzer Baratz LLP (57) ABSTRACT

A method and a system for detecting an occurrence of an auto-commit operation applied to files managed by a file server compliant with write-once-read-many (WORM) rules. The method includes: allocating a plurality of non-overlapping predefined time ranges starting from a newest-changed-files time range and ending at an oldest-changed-files time range, wherein the time ranges add up to an auto-commit period associated with the auto-commit operation; repeatedly updating a count of files whose file-change-time is associated respectively with one of the allocated time ranges, wherein the updating is carried out every time the predefined time range lapses; and detecting, every time the time range lapses, an occurrence of an auto-commit operation applied to at least one of the files stored on the volume within a duration of the time range since the updating, whenever the count of the files associated with the oldest-changed-files time range is non-zero.

20 Claims, 5 Drawing Sheets

METHOD AND SYSTEM FOR SCAN-FREE DETECTION OF AUTO-COMMITTED FILES IN A WRITE-ONCE-READ-MANY STORAGE DEVICES

FIELD OF THE INVENTION

The present invention relates generally to the field of storage devices, and more particularly to such devices compliant with write-once-read-many (WORM) standards.

BACKGROUND OF THE INVENTION

Prior to the background of the invention being set forth, it may be helpful to provide definitions of certain terms that will be used hereinafter.

The term "file" as used herein refers to a container for storing data in a file system.

The term "directory" as used herein refers to a cataloging structure which contains references to other files, and possibly other directories. The term "file" includes the term "directory".

The term "volume" or "logical drive" refers to a single accessible storage area with a single file system. In a distributed file system, files of a same volume need not necessarily stored on the same physical storage device (e.g. hard disk). From a client perspective, however, files of the same volume are subject to the same rules and logic. It is the file system task to handle the management of the files on the volume in a manner that is transparent to the client of the file system.

The term "file system object attributes" refers to attributes of objects (e.g. files) within the file system and may include metadata associated an object such a time of last change, time of access, time of modification, as well as owner and permission data.

The term "ctime" as used herein is an example for file system object attributes and is defined as the time in which a specific file has been changed or simply the file-change-time. On the file system, a ctime gets updated whenever any of the file attributes are changed, such as changing the owner, changing the permission or moving the file to another directory but will also be updated when the file is being modified.

The term "write-once-read-many" or "WORM" as used herein is a term used for special, write-once data storage devices. The WORM storage is widely used for the purpose of protecting and preserving digital documents under regulation (e.g., broker-dealer legal requirements). The WORK rules may be configured by the client and are applied for all files in a volume on which the WORM rules are defined.

A WORM storage should protect committed files, which are files that were distinguished in some way by the WORM protocol of the storage. The WORM storage protects the committed files for a given retention time period. At the end of the retention period the files may be deleted by the user.

Auto-commit is a procedure which is used to commit many files automatically by the file system. Namely, the auto-commit rule states that any file becomes committed if it was not changed for a given time period (referred herein as the auto-commit period). For example, by setting the auto-commit period to one hour, the administrator may commit all the existing files that were not changed in the past hour, together with any file that will remain unchanged for at least one hour in the future.

The auto-commit procedure presents a great challenge in the implementation of WORM storage device.

According to the WORM requirements a specified volume, must not be deleted as a whole if it contains committed files. It is therefore necessary for the storage system to block such delete attempts if committed files exist in the volume.

To this end it is necessary to calculate the future time in which all the current files in a specified volume have expired and then, and only then, the entire volume to which the specified WORM rules apply can be deleted. This time is called the maximal expiration time of the volume which is sometimes referred to as the retention period of the committed files.

However, the implicit nature of auto-commit operation requires the file system managing the volumes to take some action to verify that there are no auto-committed files, before allowing the user to delete the specific volume. For example, all the files in the volume should be scanned to find which files were not changed for the auto-commit period, and check that all the auto-committed files are past their retention time.

Existing technologies prevent the deletion of a storage unit which contains WORM committed files in either of the following ways:

Always blocking the deletion of a volume which is not empty, regardless of the WORM status of the files in this volume. This solution is a strong limit, as the administrator is required to check and delete each file in the volume before deleting the entire volume.

Another known solution is performing a periodical scan over all the files in the specific volume to identify auto-committed files and calculate the maximal expiration time. The drawbacks of this solution are the overhead of the repeated scan and the discovery time of the auto-committed files (meaning auto-commit may take place only few hours after the designated time, when the file is scanned).

SUMMARY OF THE INVENTION

Some embodiments of the present invention provide a method for fast detection of presence of auto-committed files in device volume managed by a file system, together with a fast calculation of the time when the entire volume may be deleted. The advantage is increased efficiency for the file system, with no performance penalty caused by long scans, while having the maximal expiration time of the volume always.

Some embodiments of the present invention are based on the fact that in order to block illegal delete of the entire volume it is sufficient to know if there is at least one file, which did not change for the auto-commit time period and is therefore a committed file that should not be deleted throughout the defined retention period.

Some embodiments of the present invention enable a file system that manages a plurality of volumes, to keep on-going track of the number of unchanged files per each of the volumes it manages, by updating a set of counters monitoring whenever a file is created, changed or deleted thereby detecting an occurrence of an auto commit operation as it happens.

According to some embodiments of the present invention, whenever a time at a duration of the time range (time slot) has lapsed (i.e. the time slot has expired), the count of younger counters (bins) is moved to the counters that are one time range older, whereas the files on the oldest counters are committed hence the expiry date of the entire volume is calculated (and updated if needed be). Additionally, the counter of the lowest time range (being the youngest counter) is zeroed.

According to some embodiments of the present invention, in a response to increasing the predefined retention period into an updated retention period, updating the expiration date based on the updated retention period.

According to some embodiments of the present invention, in a response to changing the predefined auto-commit period into an updated auto-commit period, the file system is configured to add or subtracting a number of the counters in the set of counters so that the overall time ranges associated with the counters add up to the updated auto-commit period. By the aforementioned feature, a client or the file system administrator can configure the auto commit period for each one or more volumes which dictates the number of counters that need to be used in order to monitor the ctime of all files in a specified volume for the entire updated auto commit period.

According to some embodiments of the present invention, in response to changing a length of the time range being the temporal resolution of the counter update period, into an updated time range (hence a lower or higher temporal resolution), the file system may be configured to add or subtract a number of the counters in the set of counters so that the overall updated time ranges associated with the counters add up to the auto-commit period. By the aforementioned feature, a client or the file system administrator can configure the temporal resolution of the update process for the counters which dictates the resolution of the detection mechanism for auto committed files.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In order to address the drawbacks of the prior art, some embodiments of the present invention are aimed at detecting an occurrence of an auto commit operation applied to at least one file on a specific volume and further calculate the maximal expiration time of the volume on the storage device. The detection may be achieved, as detailed hereinafter, using sliding counters Advantageously, some embodiments of the present invention enable the system administrator to change the values of the auto-commit period or the retention period.

The solution in accordance with embodiments of the present invention makes use of an existing file attribute that keeps the last time the file was changed, called ctime. It is noted that the ctime of a specified file does not change once the file is committed.

In accordance with some embodiments of the present invention, the auto-commit time period may be divided into time ranges (e.g., each range is one hour), possibly using a counter for each time range. Each counter holds the number of files that were not changed from that time. Namely, that their ctime attribute falls within the corresponding time range of the counter.

In accordance with some embodiments of the present invention, at the end of the duration of a single time range (e.g., every one hour), the last counter holds the number of newly auto-committed files. These files have common expiration date which complies with the current retention time defined (possibly by the user/client) for each volume on the file system. In a case that the expiration date is later than the maximal expiration date defined for the specific volume in the file system, then it becomes the new maximal expiration time of the volume spanning or stored on one of more storage devices. The last counter can then be discarded, and a new counter is added as the first counter.

Figure 1:
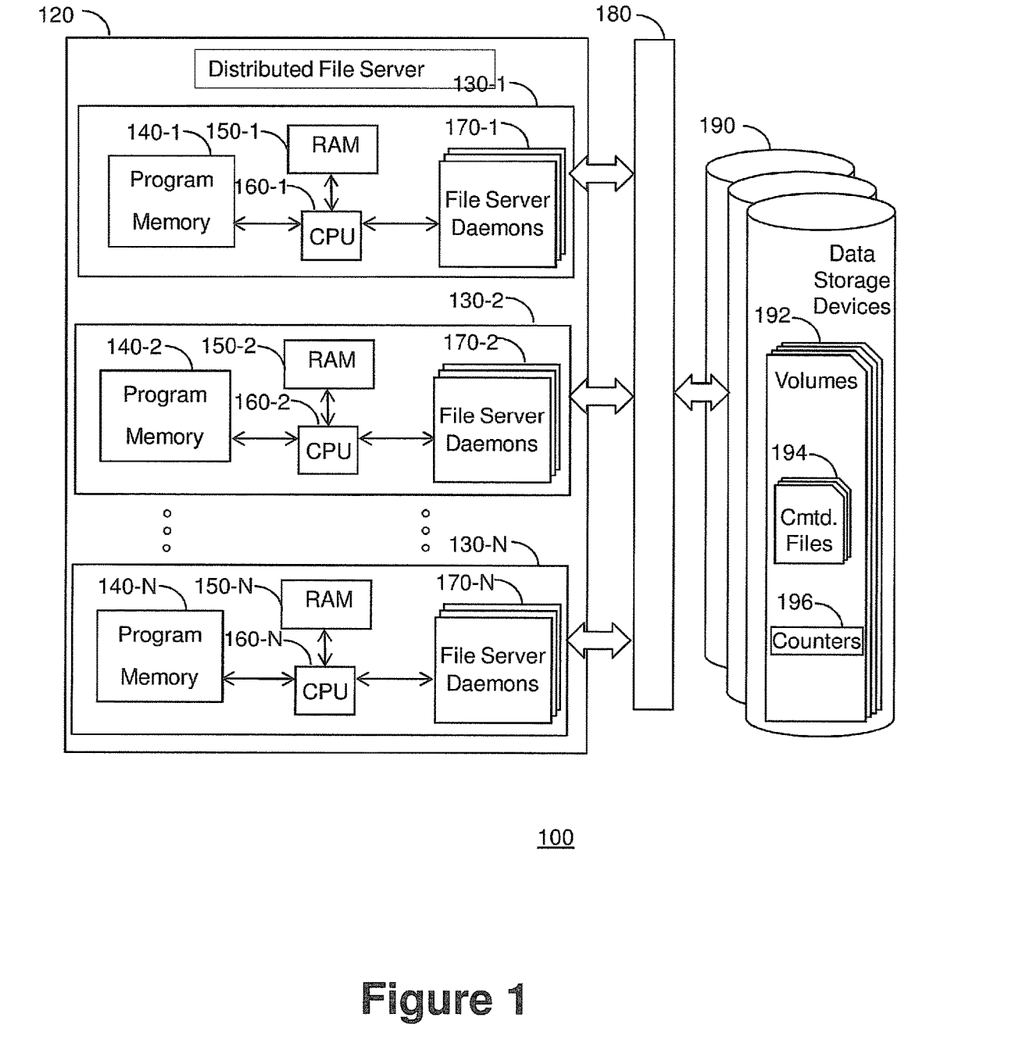
FIG. 1 is a block diagram illustrating non-limiting exemplary architecture of a file system in accordance with some embodiments of the present invention.

FIG. 1 is a block diagram illustrating non-limiting exemplary and simplified architecture of a distributed file system 100 implementing a Network Attached Storage (NAS) in accordance with embodiments of the present invention. Distributed file system 100 may include a distributed file server 120 compliant with write-once-read-many (WORM) rules associated with an auto-commit operation applied to files managed by file system 100.

Distributed file server 120 may include a plurality of nodes (aka controllers) 130-1 to 130-N connected to a bus 180 operating in Internet Small Computer Systems Interface (iSCSI), a fiber channel (FC) or the like. Bus 180 connects distributed file server 120 to a plurality of block storage devices 190 possibly configured as a part of a Storage Area Network (SAN) device aligned, for example, in a Redundant Array of Independent Disks (RAID) configuration.

Each of nodes 130-1 to 130-N may include a central processing unit (CPU) 160-1 to 160-N, and a respective random access memory (RAM) 150-1 to 150-N respectively, on which several processes are being executed.

Nodes 130-1 to 130-N may communicate with a plurality of clients (not shown here) over network protocols such as Network File System (NFS) and Server Message Block (SMB) wherein the clients send various commands relating to files stored on file system 100 and managed by distributed files server 120.

Some of the processes running over nodes 130-1 to 130-N may include on or more file system daemons (FSDs) 170-1 to 170-N. Each of nodes 130-1 to 130-N may include one or more FSDs which serve as containers for services and effectively control a specified number of allocated files (known as domain) in distributed file system 100.

Files in distributed file server 120 are distributed across FSDs 170-1 to 170-N and across nodes 130-1 to 130-N based on some load balancing mechanism. Each of nodes 130-1 to 130-N on distributed file server 120 may include respective program memory 140-1 to 140-N where files and file object attributes (e.g., file metadata) are stored immediately before they are being uploaded to data storage devices 190.

It is noted that while volumes 192 are logic entities defined and managed by the clients, from the point of view of file system 100, a specific volume may span over one or more of data storage devices (which are physical entities). Additionally, while a specific number of files (e.g., domain) are allocated to a specific node of nodes 130-1 to 130-N, files from more than one domain (or node) may be associated with a specific volume.

Therefore, each of FSDs 170-1 to 170-N is allocated with its own files stored on one or more volumes 192 which in turn are stored on one or more data storage devices 190. As file system 100 may be compliant with WORM rules, some of the files on each volume may be committed files 194 which is indicative that the volume associated with committed files 194 cannot be deleted throughout the maximal retention period.

For each of volumes 192 a specified (and possibly different) set of WORM rules (e.g. auto-commit period and retention period) may apply. Therefore, each of nodes 130-1 to 130-N need to adhere to all WORM rules as applied to all volumes 194 on data storage devices 190 because at least theoretically, at least some the committed files 194 each on one of the volumes 192 may be associated with any one of the nodes 130-1 to 130-N.

In accordance with embodiments of the present invention, each one of nodes (file system managers) 130-1 to 130-N may be responsible for its own share (domain) of the entire files in the file system, without overlapping between the domains.

As explained above, this share of files (domain) may include files from all the volumes which may need be compliant with specified WORM rules.

In accordance with embodiments of the present invention, in order to monitor the auto-committed files 194 a set of counters 196 may allocated to each volume of volumes 192 wherein the counters may be stored on data storage devices 190 (as well as on program memories 140-1 to 140-N) and hold metadata relating to files associated with a respective volume.

Specifically, counters may be updated by a respective node in a manner that will be detailed below, based on the number of files having a change file time (ctime) within one of a plurality of time ranges spanning the auto commit time period.

Thus, according to embodiments of the present invention, every node of nodes 130-1 to 130-N needs to handle all of volumes 192 and hence handles all WORM policy engines and all the counter sets.

In other words, there is one counter set per volume, and all nodes 130-1 to 130-N update counters 196 of all volumes 192. As indicated above, every volume may be stored on several data storage devices 190. Therefore, if each domain of files which is managed by FSDs 170- to 170-N is represented in each of volumes 192 it is sufficient to count the ctime of the files in each domain and monito, using the counters, the time files become auto-committed. Then, for each domain, the maximal retention time becomes the retention time for the files of this domain. Since all domains may be represented in a specific volume, it is then required to repeat the monitoring of the ctime counting in all domains. The maximal retention time in all domains then indicate the maximal retention time for the respective volume, which is used and updated if needed, to comply with the WORM rules for each volume. More specifically, in accordance with embodiment of the present invention, for each of volumes 192 stored on a plurality of storage devices 190, there is provided a set of counters 196, for each of volumes 192, each of the counters associated with a non-overlapping time range starting from a newest-changed-files time range and ending at an oldest-changed-files time range, wherein the time ranges add up to an auto-commit period associated with the auto-commit operation, wherein the counters are stored on the at least one data storage device 190.

According to some embodiments of the present invention, each of nodes 130-1 to 130-N may include sets of instructions stored on program memory 140-1 to 140-N that when executed on respective CPU 160-1 to 160-N and RAM 150-1 to 150-N are configured to: repeatedly update respective counts on the plurality of counters whose file-change-time is associated respectively with one of the allocated time range, wherein the update is carried out at in a temporal resolution of the time range; and determine an occurrence of an auto-commit operation applied to at least one of the files stored on the volume, whenever the count of the files associated with the oldest-changed-files time range becomes non-zero.

According to some embodiments of the present invention, the WORM rules may include a predefined retention period and an expiration date, wherein during the predefined retention period and until the expiration date, the respective volume should not be deleted as long as the volume contains auto-committed files.

Figure 2:
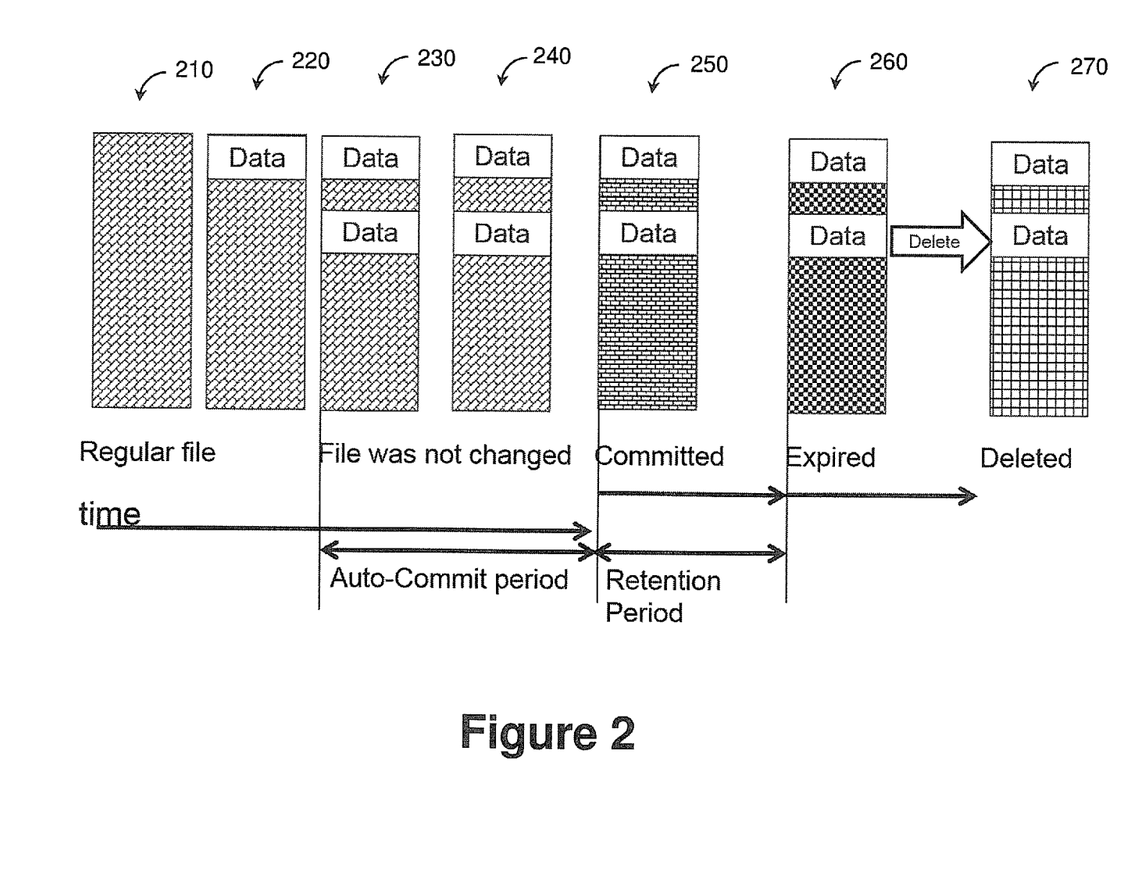
FIG. 2 is a timing diagram illustrating an aspect in accordance with some embodiments of the present invention.

FIG. 2 is a timing diagram illustrating the life cycle of files in a WORM compliant file system, in accordance with some embodiments of the present invention. Step 200 shows a file with no data in it. In step 210 some data is written and then again more data is written to the file in step 230. Then, nothing in the file changes in step 240 until the auto-commit period lapses and the file becomes committed in step 250 and cannot be deleted until the retention period expires on step 260 and only then it can be deleted as in step 270.

According to some embodiments of the present invention, the step of repeatedly updating of the counters may include:
  incrementing a count associated with the newest changed files time range, whenever a file is created in the volume;

decrementing a count associated with a time range that contains a file-change-time of a file that is deleted in the volume; and incrementing a count associated with a time range that contains a file-change-time of a file that is modified and decrementing a count associated with a previous time range.

According to some embodiments of the present invention, whenever a time at a duration of the time range (time slot) has lapsed (i.e. the time slot has expired), the count of younger counters (bins) is moved to the counters that are one time range older, whereas the files on the oldest counters are committed hence the expiry date of the entire volume is calculated (and updated if needed be). Additionally, the counter of the lowest time range (being the youngest counter) is zeroed.

Figure 3:
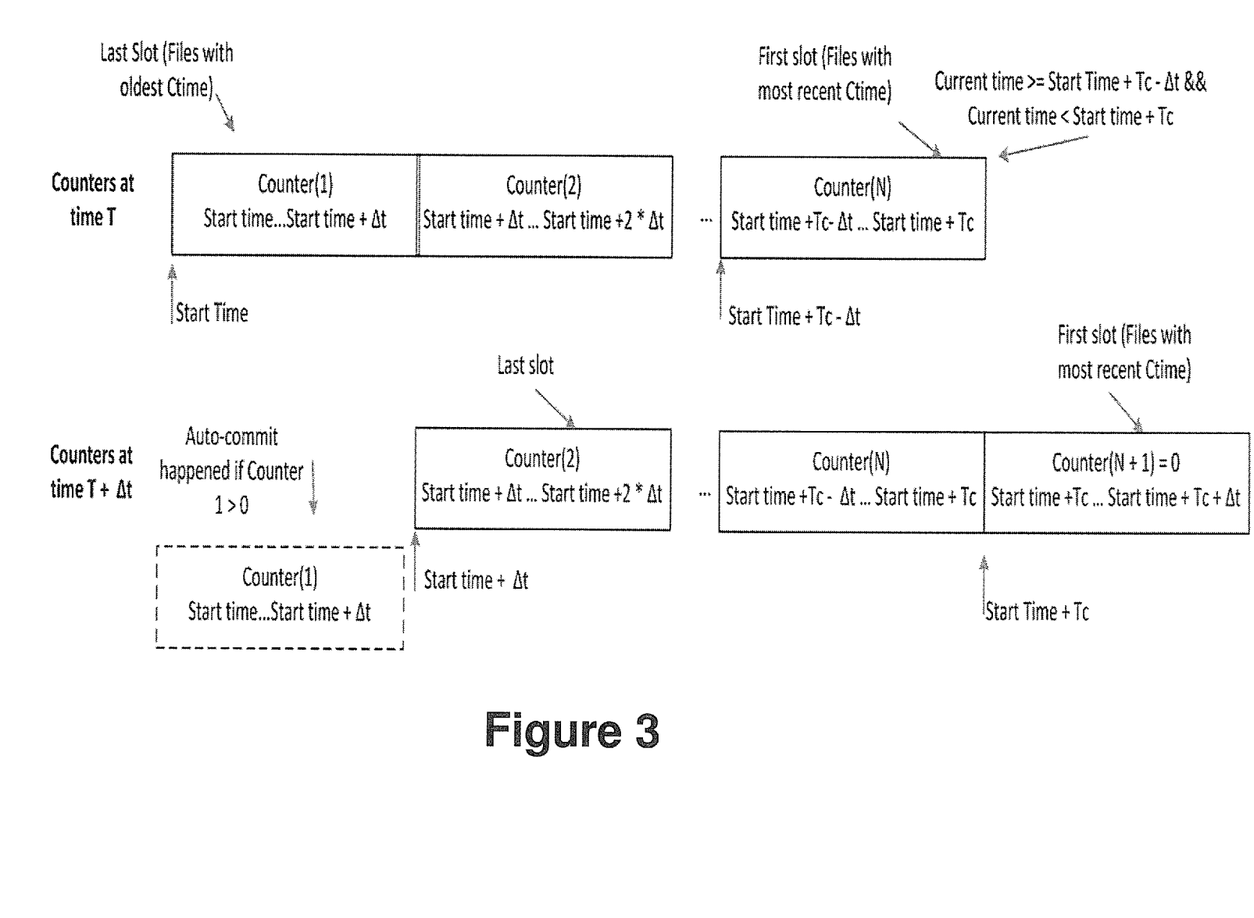
FIG. 3 is a timing diagram illustrating another aspect in accordance with some embodiments of the present invention.

FIG. 3 is a timing diagram illustrating another aspect in accordance with some embodiments of the present invention. All N counters at time T are shown where Counter(1) indicates the files with the oldest ctime, and counter(N) indicates the files with the newest ctime arranges per predefined time ranges (time slots). Upon update after the lapse of the time slot $\Delta T$, Counter(1) is checked and if non zero, it means files were auto-committed. Then all counters are being updated with the count in the counter of a newer counter, and the Counter (N+1) is zeroed as the one folding the freshest data on ctimes.

Figure 4:
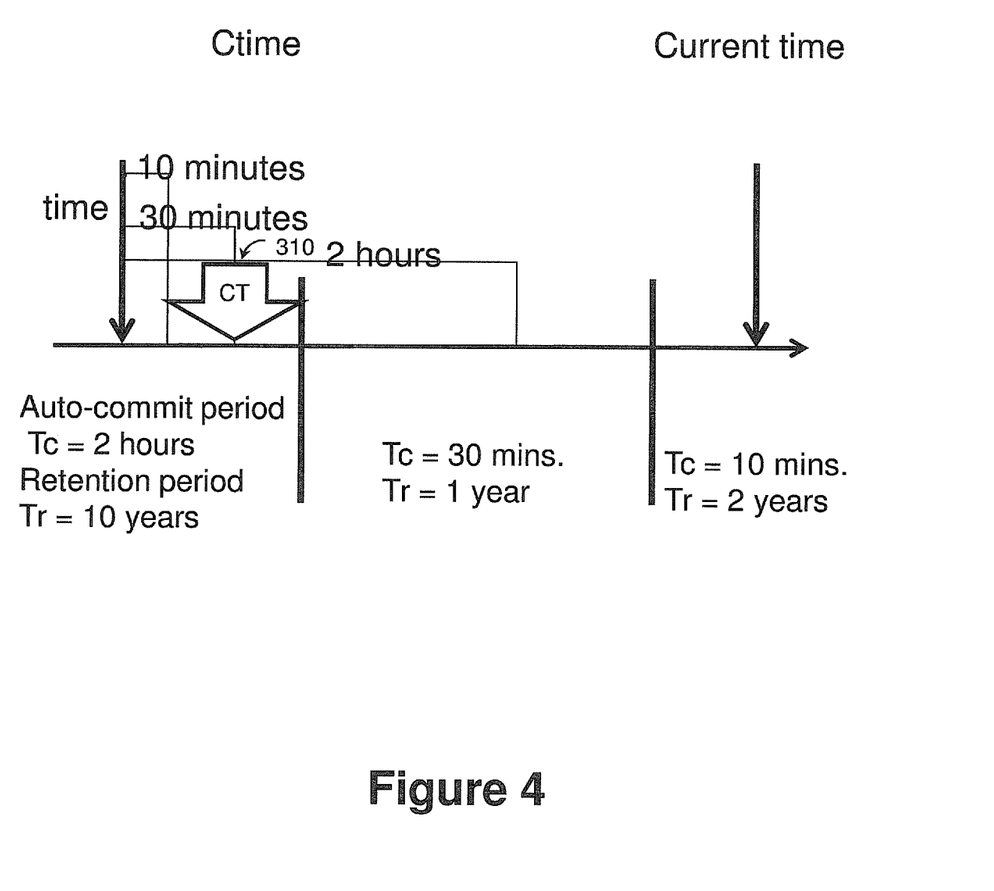
FIG. 4 is a timing diagram illustrating yet another aspect in accordance with some embodiments of the present invention.

FIG. 4 is a timing diagram illustrating yet another aspect in accordance with some embodiments of the present invention where auto commit time (Tc) and retention period (Tr) can be changes per user definition without affecting how some embodiments of the present invention is implemented.

According to some embodiments of the present invention, in a response to increasing the predefined retention period into an updated retention period, updating the expiration date based on the updated retention period.

According to some embodiments of the present invention, in a response to changing the predefined auto-commit period into an updated auto-commit period, the file system is configured to add or subtracting a number of the counters in the set of counters so that the overall time ranges associated with the counters add up to the updated auto-commit period. By the aforementioned feature, a client or the file system administrator can configure the auto commit period for each one or more volumes which dictates the number of counters that need to be used in order to monitor the ctime of all files in a specified volume for the entire updated auto commit period.

According to some embodiments of the present invention, in response to changing a length of the time range being the temporal resolution of the counter update period, into an updated time range (hence a lower or higher temporal resolution), the file system may be configured to add or subtract a number of the counters in the set of counters so that the overall updated time ranges associated with the counters add up to the auto-commit period. By the aforementioned feature, a client or the file system administrator can configure the temporal resolution of the update process for the counters which dictates the resolution of the detection mechanism for auto committed files.

Advantageously, the aforementioned mechanism allows a system administrator to have the maximal expiration time in the WORM storage unit at all times, without the overhead of periodical scan.

The aforementioned framework may be denoted herein as an auto-commit sliding window, and is described hereinafter in further detail below.

For example, if the auto-commit time period is three hours. Three counters are defined, each of which corresponds to a one hour. The first counter is the number of files that were not changed in the past hour, the second counter is the number of files that were not changed in the past two hours and the third counter is the number of files that were not changed for the last three hours.

In accordance with some embodiments of the present invention, whenever a new file is created in the storage unit, the first counter is incremented by one. If a file is deleted, its ctime attribute may be used to decrement the appropriate counter. If an existing file is changed, its ctime attribute may be used to decrement the appropriate counter and increment the first counter by one.

In accordance with some embodiments of the present invention, the counter may be updated only when a file moves to another time range. In other words, if the size of the time range is one hour, then a file that is repeatedly changed will cause the counters to be updated only once per hour at the most.

Auto-Commit Sliding Window

In accordance with some embodiments of the present invention, the role of the sliding window is to discover if auto-commit occurred within a given time granularity. To this purpose we count the number of files that were changed at each time interval.

Sliding Window Frame

In accordance with some embodiments of the present invention, Tc is denoted herein as the auto-commit time. In further details, a file is first being associated with a counter (bin) that is being aligned or shifted every predefined time range (time slot, defining the resolution of the auto commit detection mechanism). Then a file is regarded as committed if the file has not been changed for the last Tc+bin alignment time (the number of time shifts multiplied by the duration of the time range or time slot)

In accordance with some embodiments of the present invention, Tr may be the retention period of committed files, in which the files cannot be changed or deleted. The counting is done over a total time period equal to Tc. This time period is divided into time ranges, where each range has its own counters as in formula (1) herein:

$$\text{Time range } \Delta t = Tc/\text{Number of counters} \quad (1)$$

In accordance with some embodiments of the present invention, each counter counts the number of files that their ctime falls at the corresponding time interval.

Updating the Sliding Window

In accordance with some embodiments of the present invention, the counters in the sliding window may be updated when:

File creation—first counter is incremented;

File deletion—counter that corresponds to file's ctime is decremented; and

File modification—If the new ctime falls in a different range, the counter of the old ctime is decremented and the counter of the new ctime is incremented.

Calculating the Maximal Expiration Time

In accordance with some embodiments of the present invention, every time the time slot expires (e.g., the predefined time range has lapsed) then the oldest counter (bin) is checked and if it is not zero, then the maximal expiration time (i.e., the expiry date of the entire volume) is updated by adding the retention time to the current time.

Accounting for Changes in the Auto-Commit Time and Retention Period

In accordance with some embodiments of the present invention, both the retention period and the auto-commit period can be changed by the administrator. A file system in accordance with embodiments of the present invention may commit any file that remains unchanged for the auto-commit time period. The time of commit may be the time in which a file becomes auto-committed (can only happen once). The file remains committed for the retention period, starting at the time of commit.

Accounting for Changes in the Retention Period

In accordance with some embodiments of the present invention, at first, the size of the retention period is the default retention period at the time of commit. If the default retention time is decreased, then files that are already committed with longer retention period are not affected.

Obviously, reducing the default retention time cannot reduce the maximal expiration date (since expiration date of a committed file is never decreased). Only the next auto-committed files will be assigned with the new retention time.

According to some embodiments of the present invention if the default retention time is increased, then files that are already committed with a shorter retention period will not be affected retroactively. This will not affect the overall expiry date of the volume so no compliance issues with WORM rules may occur.

For example, in a case of a file which was auto-committed on Jan. 1, 2017 with retention of one year (i.e. to be expired on Jan. 1, 2018). If the administrator changed the retention period to 6 months, the file will still be expired on Jan. 1, 2018.

According to further embodiments of the present invention, it is also possible to change the auto commit time by adding counters or reducing their number as well as increasing or reducing the duration of each time range associated with a counter.

Similarly, the resolution of the auto commit detection mechanism may be controlled by changing the time range and the number of counters respectively so as to maintain the auto commit period.

A person having ordinary skills in the art will know, based in embodiments described herein, how to implement changing of the auto commit period as well as controlling the resolution of the auto commit detection mechanism.

Accounting for Changes in the Auto-Commit Time Period

As mentioned before, a file system in accordance with embodiments of the present invention may commit any file that remains unchanged for the auto-commit time period.

Changes in the auto-commit time take effect immediately (i.e., applied on the existing files retroactively).

In accordance with some embodiments of the present invention, if the auto-commit time period is decreased (hence files should be committed faster), the current sliding window before the change has all the necessary counters to update the max expiration date of the volume. For example, if the auto-commit time period was initially two hours and if the resolution is one hour, the sliding window consists of two counters: the first counter is the number of files that were last changed up to one hour ago, and the second counter is the number of files that were last changed more than an hour ago. Every hour the a file system in accordance with embodiments of the present invention examines the value of the second counter, updates the maximal expiration time, shifts the first counter to be the second, and resets the first counter to zero. Now, if the administrator changed the auto-commit time to one hour, then the files represented by the second counter (i.e., more than an hour old) are immediately auto-committed and the maximal expiration time is updated accordingly. The second counter is now the only counter in the sliding window.

If the auto-commit time period is increased (hence files should be committed slower), then this obviously cannot change the current value of the maximal expiration date of the volume, as all the files which meet the new criterion already met the previous one.

Therefore, once the auto-commit period is changed, the size of the sliding window can be made the exact size of the new auto-commit time period. The data for the new sliding window is filled using the previous window, by moving the old counters to the appropriate bin in the new window.

The size of the time interval (or time range) controls the precision (or temporal resolution) in detecting auto-commit (only concerning the maximal expiration time of the volume). For example, if the time interval is one hour then the auto-commit time (and hence the file expiration date) is at the worst one hour past the actual time. It follows that the max expiration date is at worst one hour past the real expiration date of the volume (but never sooner than the accurate time)

Advantageously, a file system in accordance with embodiments of the present invention allows customers of the file system to use the WORM feature without the performance penalty experienced in other NAS products, and without compromising in the administrator abilities to manage the NAS system Advantageously, any scale out NAS provider may want to use a file system in accordance with embodiments of the present invention for evaluating any automatic time dependent changes in some file characteristic (e.g. for archiving cold data or any other maintenance operation).

Figure 5:
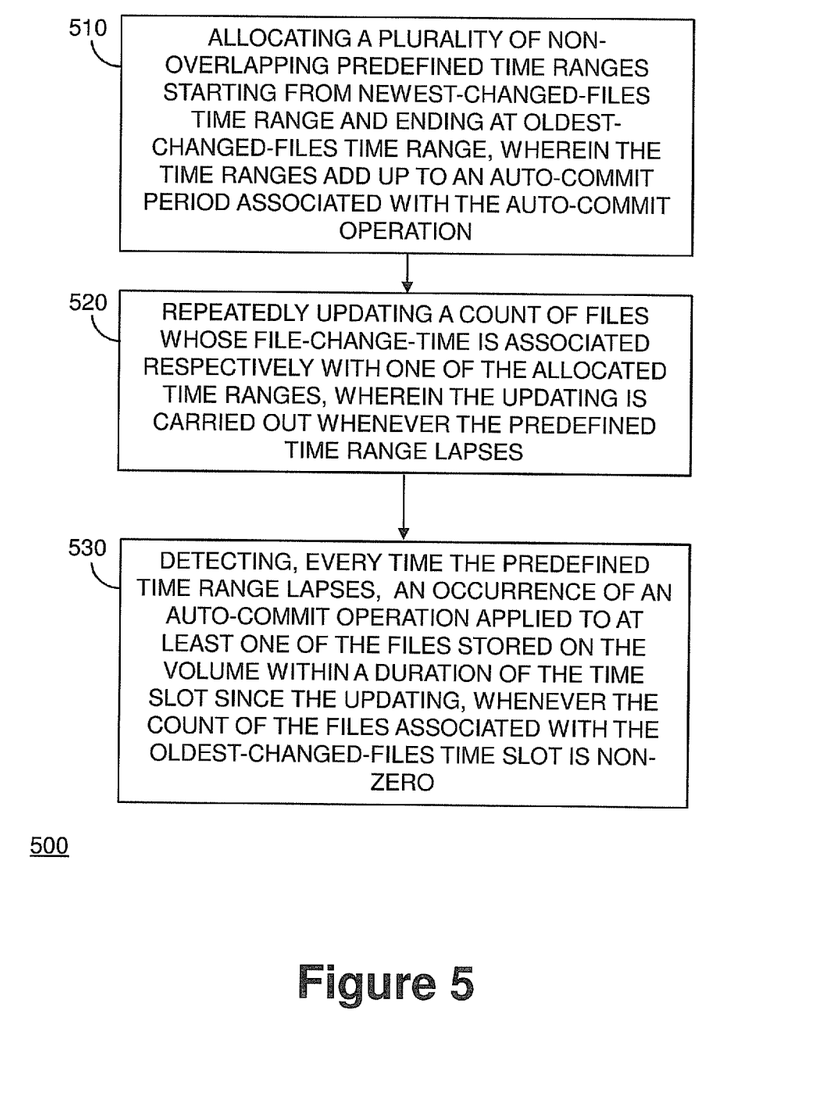
FIG. 5 is a high-level flowchart illustrating non-limiting exemplary method in accordance with some embodiments of the present invention.

FIG. 5 is a high-level flowchart illustrating non-limiting exemplary method in accordance with embodiments of the present invention. Method 500 is a method of determining an occurrence of an auto commit operation applied to files in a file system that is compliant with write-once-read-many (WORM) rules associated with the auto-commit operation associated with respective volumes stored on at least one data storage device. Method 500 may include the following steps: allocating a set of counters, for each of the volumes, each of the counters associated with a non-overlapping time range starting from a newest-changed-files time range and ending at an oldest-changed-files time range, wherein the time ranges add up to an auto-commit period associated with the auto-commit operation, wherein the counters are stored on the at least one data storage device 510; repeatedly updating respective counts on the plurality of counters whose file-change-time is associated respectively with one of the allocated time range, wherein the update is carried out at in a temporal resolution of the time range 530; and determining an occurrence of an auto-commit operation applied to at least one of the files stored on the volume, whenever the count of the files associated with the oldest-changed-files time range becomes non-zero 530.

According to some embodiments of the present invention, the WORM rules may include a predefined retention period and an expiration date, wherein during the predefined retention period and until the expiration date, the respective volume should not be deleted as long as the volume contains auto-committed files, wherein responsive to the step of detecting of an occurrence of an auto-commit operation at a current time 530, the expiration date for the respective volume is updated whenever the predefined retention period plus the current time exceeds the expiration date previously defined for the respective volume.

According to some embodiments of the present invention, wherein the step of repeatedly updating of the counters 520 may include:
- incrementing a count associated with the newest changed files time range, whenever a file is created in the volume;
- decrementing a count associated with a time range that contains a file-change-time of a file that is deleted in the volume; and
- incrementing a count associated with a time range that contains a file-change-time of a file that is modified and decrementing a count associated with a previous time range.

According to some embodiments of the present invention, after the lapsing of each time slot (time range), carrying out a step of updating the count of each of the time ranges, with the count of its preceding time range and then zeroing the count of the files associated with the newest-changed-files time range.

According to some embodiments of the present invention, wherein in a response to changing the predefined auto-commit period into an updated auto-commit period, Method 500 includes the step of adding or subtracting a number of the counters in the set of counters so that the overall time ranges associated with the counters add up to the updated auto-commit period. By the aforementioned feature, a client or the file system administrator can configure the auto commit period for each one or more volumes which dictates the number of counters that need to be used in order to monitor the ctime of all files in a specified volume for the entire updated auto commit period.

As may be implemented by a person having ordinary skills in the art, and based on some embodiments of the present invention, in response to changing a length of the time range being the temporal resolution of the counter update period, into an updated time range (hence a lower or higher temporal resolution), method 500 may be further improved to include the step of adding or subtracting a number of the counters in the set of counters so that the overall updated time ranges associated with the counters add up to the auto-commit period. By the aforementioned feature, a client or the file system administrator can configure the temporal resolution of the update process for the counters which dictates the resolution of the detection mechanism for auto committed files.

In accordance with some embodiments of the present invention method 500 may be implemented by a non-transitory computer readable medium that includes a set of instructions, that when executed, cause the least one computer processor to: allocate a plurality of non-overlapping time ranges starting from a newest-changed-files time range and ending at an oldest-changed-files time range, wherein the time ranges add up to an auto-commit period associated with the auto-commit operation; repeatedly update a count of files whose file-change-time is associated respectively with one of the allocated time ranges, wherein the updating is carried out at a frequency of once per the time range; and detect an occurrence of an auto-commit operation applied to at least one of the files stored on the volume within a duration of the time range since the updating, whenever the count of the files associated with the oldest-changed-files time range is non-zero.

In order to implement the method according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory based solid state disks (SSDs) and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only. The principles and uses of the teachings of the present invention may be better understood with reference to the accompanying description, figures and examples.

It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
   a file system compliant with write-once-read-many (WORM) rules associated with an auto-commit operation applied to files managed by said file system and associated with respective volumes;
   at least one data storage device configured to store said files of the at least one volume associated with the WORM rules; and
   a set of counters, for each of the volumes, each of the counters associated with a non-overlapping time range starting from a newest-changed-files time range and ending at an oldest-changed-files time range, wherein the time ranger add up to an auto-commit period associated with the auto-commit operation, wherein the counters are stored on the at least one data storage device,
   wherein the file system comprises, for each domain of files, a file system daemon configured to:
      repeatedly update respective counts on the plurality of counters whose file-change-time is associated respectively with one of the allocated time range, wherein the update is carried out at whenever a duration of the time range lapses; and
      determine, at an end of every time range, an occurrence of an auto-commit operation applied to at least one of the files stored on the volume, whenever the count of the files associated with the oldest-changed-files time range becomes non-zero.

2. The system according to claim 1, wherein the WORM rules include a predefined retention period and an expiration date, wherein during the predefined retention period and up till the expiration date, the volume should not be deleted as long as the volume contains auto-committed files,
   wherein responsive to the detecting of an occurrence of an auto-commit operation at a current time, the expiration date for the volume is updated whenever the predefined retention period plus the current time exceeds the expiration date previously defined for the volume.

3. The system according to claim 1, wherein the file system daemon is configured to repeatedly update the counters by:
   incrementing a count associated with the newest changed files time range, whenever a file is created in said volume;
   decrementing a count associated with a time ranger that contains a file-change-time of a file that is deleted in said volume; and
   incrementing a count associated with a time range that contains a file-change-time of a file that is modified and decrementing a count associated with the previous file time range.

4. The system according to claim 1, wherein at an end of every time range lapsing, said file system is configured to update the count of each of the time ranges, with the count of its preceding time range and zero the count of the files associated with the newest-changed-files time range.

5. The system according to claim 2, wherein responsive to increasing said predefined retention period into an updated retention period to the file system is configured to update said expiration date based on the updated retention period.

6. The system according to claim 1, wherein responsive to changing said predefined auto-commit into an updated auto-commit period by said WORM policy engine, in a case that the updated auto-commit period is shorter than the predefined auto-commit period, the number of allocated time ranges is decreased by WORM policy engine, starting with the oldest-changed-files time range and newer time ranges, based on a ratio between the predefined auto-commit period and the updated auto-commit period, and
   wherein the counters of the discarded time ranges are inspected, and the maximal expiration time is updated accordingly.

7. The system according to claim 1, wherein responsive to changing said predefined auto-commit period into an updated auto-commit period, adding or subtracting counters so that the overall time ranges associated with the counters add up to the updated auto-commit period. the system according to claim 1, wherein responsive to changing a length of said time range being said temporal resolution of the counter update into an updated time range, adding or subtracting counters so that the overall updated time ranges associated with the counters add up to the auto-commit period.

8. A method for determining an occurrence of an auto commit operation applied to files in a file system that is compliant with write-once-read-many (WORM) rules associated with said auto-commit operation associated with respective volumes stored on at least one data storage device;
   allocating a set of counters, for each of said volumes, each of the counters associated with a non-overlapping time range starting from a newest-changed-files time range and ending at an oldest-changed-files time range, wherein said time ranges add up to an auto-commit period associated with said auto-commit operation, wherein said counters are stored on said at least one data storage device;
   repeatedly updating respective counts on said plurality of counters whose file-change-time is associated respectively with one of said allocated time range, wherein the update is carried out every time a time range lapses; and
   determining, at every time a time range lapses, an occurrence of an auto-commit operation applied to at least one of the files stored on said volume, whenever the count of the files associated with the oldest-changed-files time range becomes non-zero.

9. The method according to claim 8, wherein the WORM rules include a predefined retention period and an expiration date, wherein during the predefined retention period and until the expiration date, said volume should not be deleted as long as said volume contains auto-committed files,
   wherein responsive to said detecting of an occurrence of an auto-commit operation at a current time, said expiration date for said volume is updated whenever said predefined retention period plus said current time exceeds the expiration date previously defined for said volume.

10. The method according to claim 8, wherein the repeatedly updating of said counters comprises:
incrementing a count associated with the newest changed files time range, whenever a file is created in said volume;
decrementing a count associated with a time range that contains a file-change-time of a file that is deleted in said volume; and
incrementing a count associated with a time range that contains a file-change-time of a file that is modified and decrementing a count associated with the file previous time range.

11. The method according to claim 8, wherein at an end of every time range lapsing, updating the count of each of the time ranges, with the count of its preceding time range and zeroing the count of the files associated with the newest-changed-files time range.

12. The method according to claim 9, wherein responsive to increasing said predefined retention period into an updated retention period, updating said expiration date based on the updated retention period.

13. The method according to claim 8, wherein responsive to changing said predefined auto-commit period into an updated auto-commit period, adding or subtracting a number of the counters in the set of counters so that the overall time ranges associated with the counters add up to the updated auto-commit period.

14. The method according to claim 8, wherein responsive to changing a length of said time range being said temporal resolution of the counter update, into an updated time range, adding or subtracting a number of the counters in the set of counters so that the overall updated time ranges associated with the counters add up to the auto-commit period.

15. A non-transitory computer readable medium for determining an occurrence of an auto commit operation applied to files in a file system that is compliant with write-once-read-many (WORM) rules associated with said auto-commit operation associated with respective volumes stored on at least one data storage device, the computer readable medium comprising a set of instructions that when executed cause at least one computer processor to;
allocate a set of counters, for each of said volumes, each of the counters associated with a non-overlapping time range starting from a newest-changed-files time range and ending at an oldest-changed-files time range, wherein said time ranges add up to an auto-commit period associated with said auto-commit operation, wherein said counters are stored on said at least one data storage device;
repeatedly update respective counts on said plurality of counters whose file-change-time is associated respectively with one of said allocated time range, wherein the update is carried out every time the time range lapses; and
determine, every time the time range lapses, an occurrence of an auto-commit operation applied to at least one of the files stored on said volume, whenever the count of the files associated with the oldest-changed-files time range becomes non-zero.

16. The non-transitory computer readable medium according to claim 15, wherein the WORM rules include a predefined retention period and an expiration date, wherein during the predefined retention period and until the expiration date, said volume should not be deleted as long as said volume contains auto-committed files,
wherein responsive to said detecting of an occurrence of an auto-commit operation at a current time, said expiration date for said volume is updated whenever said predefined retention period plus said current time exceeds the expiration date previously defined for said volume.

17. The non-transitory computer readable medium according to claim 15, wherein the repeatedly updating of said counters comprises:
incrementing a count associated with the newest changed files time range, whenever a file is created in said volume;
decrementing a count associated with a time range that contains a file-change-time of a file that is deleted in said volume; and
incrementing a count associated with a time range that contains a file-change-time of a file that is modified and decrementing a count associated with the file previous time range.

18. The non-transitory computer readable medium according to claim 15, wherein responsive to every lapsing of the time range, updating the count of each of the time ranges, with the count of its preceding time range and zeroing the count of the files associated with the newest-changed-files time range.

19. The non-transitory computer readable medium according to claim 16, wherein responsive to increasing said predefined retention period into an updated retention period, updating said expiration date based on the updated retention period.

20. The non-transitory computer readable medium according to claim 15, wherein responsive to changing said predefined auto-commit period into an updated auto-commit period, adding or subtracting a number of the counters in the set of counters so that the overall time ranges associated with the counters add up to the updated auto-commit period.

* * * * *